United States Patent
Terashima et al.

(10) Patent No.: US 9,636,762 B2
(45) Date of Patent: May 2, 2017

(54) DESK-TOP CUTTING MACHINE

(71) Applicant: HITACHI KOKI CO., LTD., Tokyo (JP)

(72) Inventors: Hideaki Terashima, Ibaraki (JP); Takuya Konnai, Ibaraki (JP)

(73) Assignee: HITACHI KOKI CO., LTD., Tokyo (JP)

(*) Notice: Subject to any disclaimer, the term of this patent is extended or adjusted under 35 U.S.C. 154(b) by 125 days.

(21) Appl. No.: 14/413,531

(22) PCT Filed: Jul. 11, 2013

(86) PCT No.: PCT/JP2013/069711
§ 371 (c)(1),
(2) Date: Jan. 8, 2015

(87) PCT Pub. No.: WO2014/010754
PCT Pub. Date: Jan. 16, 2014

(65) Prior Publication Data
US 2015/0174674 A1    Jun. 25, 2015

(30) Foreign Application Priority Data

Jul. 11, 2012    (JP) .................................. 2012-155178

(51) Int. Cl.
*B23D 45/04* (2006.01)
*B23D 59/00* (2006.01)

(52) U.S. Cl.
CPC ......... *B23D 59/002* (2013.01); *B23D 45/042* (2013.01); *B23D 59/001* (2013.01); *Y10T 83/7693* (2015.04)

(58) Field of Classification Search
CPC .. B23D 59/002; B23D 59/001; B23D 45/042; B23D 19/00; B23D 25/00; Y10T 83/7693; B29Q 11/12
See application file for complete search history.

(56) References Cited

U.S. PATENT DOCUMENTS 5,203,245 A    4/1993    Terpstra
5,575,271 A    11/1996    Chiuminatta et al.
(Continued)

FOREIGN PATENT DOCUMENTS

CN    1086475 A    5/1994
CN    102164699 A    8/2011
(Continued)

OTHER PUBLICATIONS

Japanese Office Action for the related Japanese Patent Application No. 2012-155178 dated Sep. 2, 2015.
(Continued)

*Primary Examiner* — Jonathan Riley
*Assistant Examiner* — Liang Dong
(74) *Attorney, Agent, or Firm* — Kenealy Vaidya LLP

(57) ABSTRACT

A desk-top cutting machine including: a base configured to support a workpiece; a cutting part including, a motor configured to rotary drive a cutting tool, a main cover covering an upper portion of the cutting tool, and a protective cover covering a portion of the cutting tool that is not covered by the main cover, the protective cover configured to move in a direction of exposing the cutting tool when the cutting part swings toward a bottom dead point from a top dead point; and a cutting part support mechanism configured to swingably support the cutting part, characterized in that: the motor is configured to be rotated at a first rotational speed slower than a maximum rotational speed thereof when the cutting part is positioned at the top dead point.

10 Claims, 10 Drawing Sheets

(56) References Cited

U.S. PATENT DOCUMENTS

| | | | | |
|---|---|---|---|---|
| 5,957,021 A | * | 9/1999 | Meredith | B23D 45/048 83/397 |
| 7,377,202 B1 | | 5/2008 | Shibata | |
| 2010/0162867 A1 | * | 7/2010 | McCracken | B23D 45/042 83/471.3 |
| 2011/0179924 A1 | | 7/2011 | Tomita et al. | |

FOREIGN PATENT DOCUMENTS

| | | |
|---|---|---|
| DE | 91 05 095 U1 | 10/1991 |
| EP | 0 353 745 A2 | 2/1990 |
| EP | 1 925 394 A1 | 5/2008 |
| JP | 57-175702 U | 11/1982 |
| JP | 6-57368 A | 3/1994 |
| JP | 6-315292 A | 11/1994 |
| JP | 2000-317901 A | 11/2000 |
| JP | 2003-159669 A | 6/2003 |
| JP | 2008-23694 A | 2/2008 |
| JP | 4108370 B2 | 6/2008 |
| JP | 2011-167830 A | 9/2011 |
| JP | 2012-11497 A | 1/2012 |

OTHER PUBLICATIONS

International Search Report and Written Opinion of the International Search Report for PCT/JP2013/069711 dated Nov. 20, 2013.
Chinese Office Action for the related Chinese Patent Application No. 2013800365127 dated Mar. 22, 2016.

* cited by examiner

B-B

DESK-TOP CUTTING MACHINE

TECHNICAL FIELD

The present invention relates to a desk-top cutting machine for cutting a workpiece on a base with a rotational cutting tool.

BACKGROUND ART

In general, such a type of desk-top cutting machine includes a base, a cutting part having an electric motor for rotating a cutting tool such as a circular saw and the like, and a cutting part support mechanism for swingably supporting the cutting part, whereby a workpiece placed on the base is cut as an operator manually operates downwardly the cutting part rotating the cutting tool.

A desk-top cutting machine operated by a battery as well as a commercial power supply has been proposed in recent years, and a demand for power saving is accordingly increasing.

PRIOR ART DOCUMENT

Patent Document

[Patent Document 1] JP-A-2011-167830

SUMMARY OF INVENTION

Technical Problem

In a related-art desk-top cutting machine, when a trigger switch is turned on, it is common for a cutting tool to be rotatably driven at the maximum speed even before an operator manually manipulates a cutting part having the cutting tool to thereby descend. For this reason, since the cutting tool is driven at the maximum speed before starting the cutting of the material to be cut, power consumption increases and noise generated also tends to increase.

The present invention has been made in view of the above-described situation, and an object of the present invention is to provide a desk-top cutting machine which is capable of reducing noise and reducing power consumption.

Solution to Problem

Advantageous Effects of Invention

According to an aspect of the present invention, there is provided a desk-top cutting machine including: a base configured to support a workpiece; a cutting part including, a motor configured to rotary drive a cutting tool, a main cover covering an upper portion of the cutting tool, and a protective cover covering a portion of the cutting tool that is not covered by the main cover, the protective cover configured to move in a direction of exposing the cutting tool when the cutting part swings toward a bottom dead point from a top dead point; and a cutting part support mechanism configured to swingably support the cutting part, characterized in that: the motor is configured to be rotated at a first rotational speed slower than a maximum rotational speed thereof when the cutting part is positioned at the top dead point.

According to the present invention, it is possible to realize noise reduction and reduction in power consumption while securing a sufficient cutting performance.

DESCRIPTION OF EMBODIMENT

Figure 1:
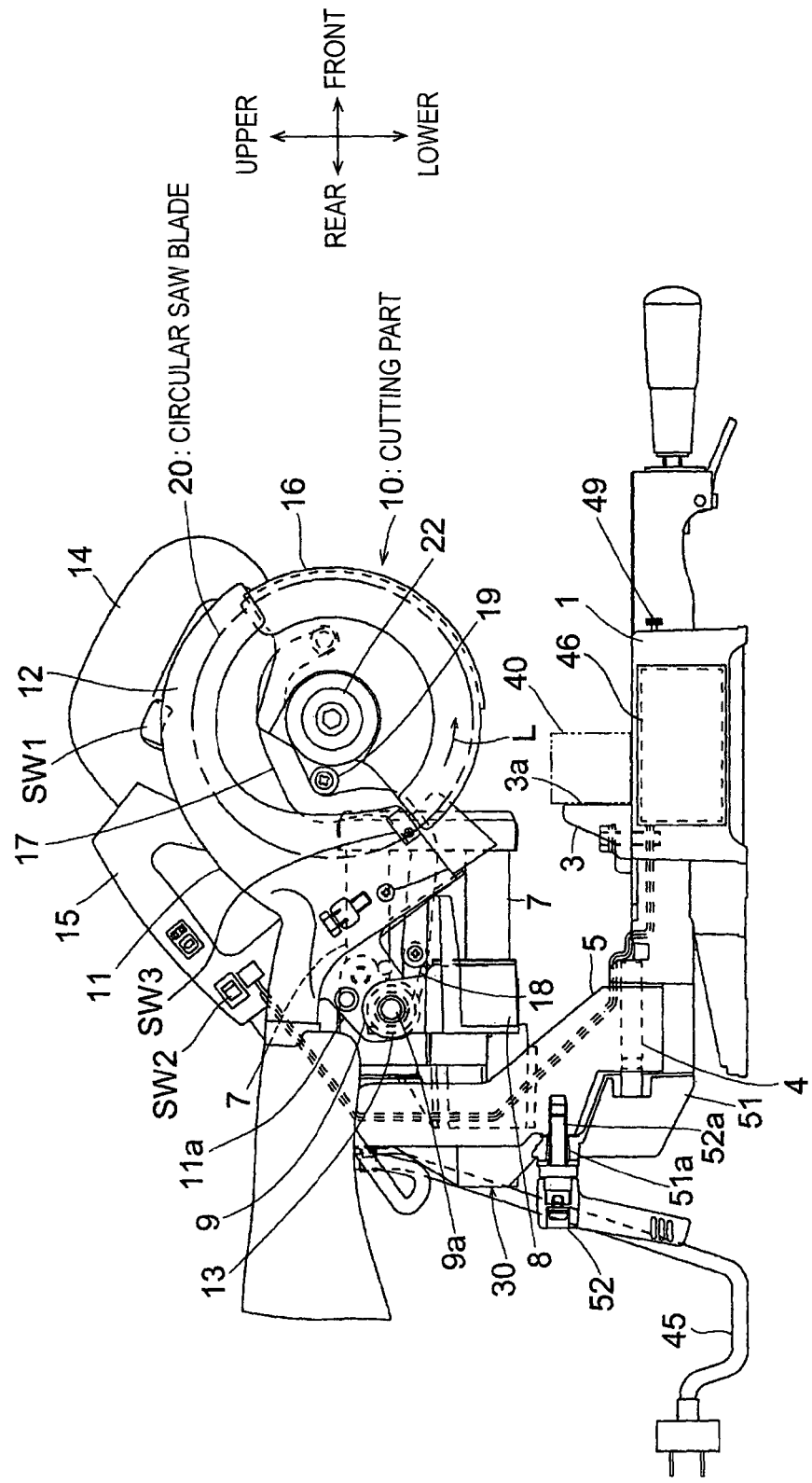
FIG. 1 is a side view showing a desk-top cutting machine according to a first embodiment of the present invention.
Figure 2:
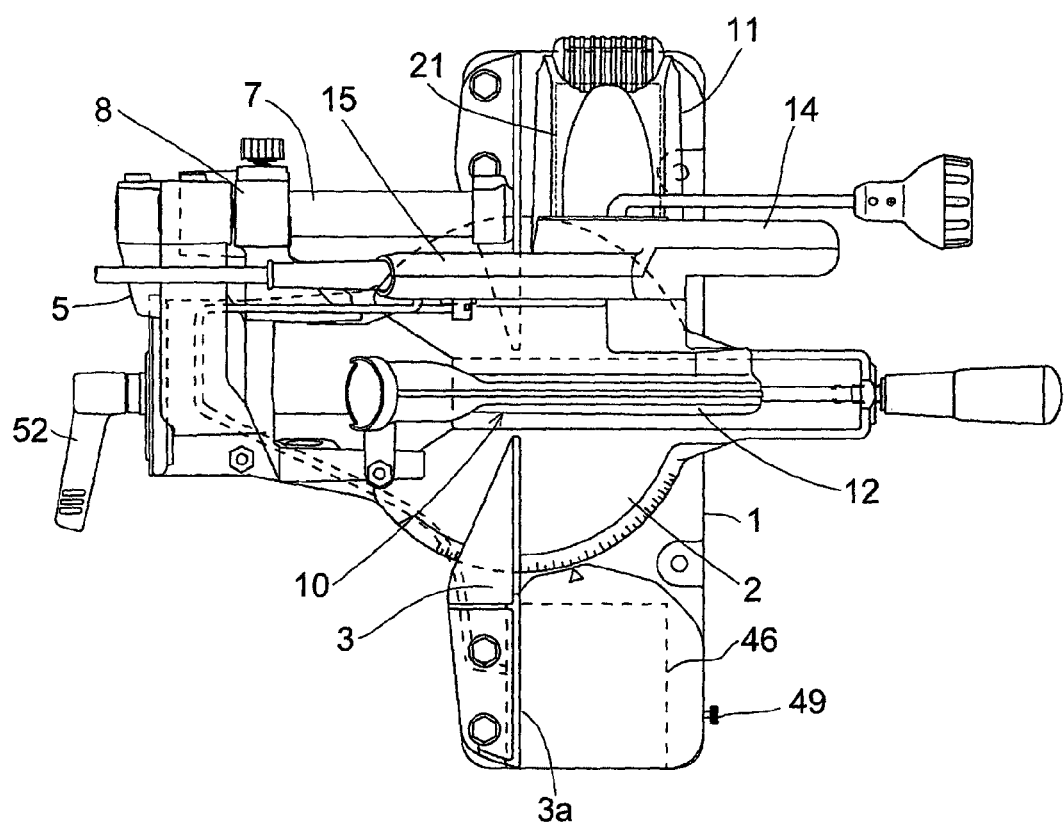
FIG. 2 is a plan view of the desk-top cutting machine of FIG. 1.

Hereinafter various embodiments of the present invention will be described with reference to the accompanying drawings. In the figures, same reference numbers refer to the same or equivalent parts of the present invention throughout the several figures of the drawing, and repetition will be omitted. Also, it will be understood that the embodiment does not intend to limit the invention but exemplify the invention. All of the features and the combinations thereof described in the embodiment are not necessarily essential to the invention.

A desk-top circular saw as a desk-top cutting machine will now be described with reference to FIGS. 1 to 8 according to the first embodiment of the present invention. In the descriptions hereinafter, the upper and lower directions and front and rear directions are defined as shown in FIG. 1.

As shown in the figures, the desk-top circular saw includes a base 1 on which a workpiece 40 can be placed, a cutting part 10 having an electric motor 21 which rotatably drives a circular saw blade 20 as a cutting tool, and a cutting part support mechanism 30 that tiltably supports a rotational face (side face) of the circular saw blade 20 with respect to the upper face of the base 1 while making the cutting part 10 swingable in upper and lower directions with respect to the base 1 and slidably supporting the cutting part 10 in parallel with the base 1.

The base 1 is configured to be placed on a floor surface, a table surface and the like. A turntable 2 is embedded in the base 1. The turntable 2 has an upper surface that is substantially flush with an upper face of the base 1. The turntable 2 is rotatably connected to the base 1 via a rotational shaft that is perpendicular to the upper face thereof. The base 1 and the turntable 2 are formed so that the workpiece 40 may be placed thereon during working.

The structure of the cutting part support mechanism 30 will be described later. The cutting part support mechanism 30 is attached to the turntable 2. When rotating the turntable 2, the cutting part support mechanism 30 and the cutting part 10 integrally rotate together with the turntable 2 (i.e. a direction with respect to the base 1 is changed).

The base 1 is provided with a pair of fences 3 each having a pressing face 3a that is substantially perpendicular to its upper face. When cutting the workpiece 40 having a rectangular cross section as indicated by an imaginary line shown in FIG. 1, since the workpiece 40 is cut by performing the cutting operation in a state where one side of the workpiece 40 is abut on the pressing face 3a of the fence 3, it is possible to perform a safety cutting operation. When rotating the turntable 2 with respect to the base 1, the cutting part 10 rotates together with the turntable 2 and accordingly changes its position relative to the fence 3, thereby changing the angle between the pressing face 3a of the fence 3 and the rotational face (side face) of the circular saw blade 20. Accordingly, the workpiece 40 abut on the fence 3 can be cut at various angles.

The cutting part support mechanism 30 includes a tilt shaft 4 supported substantially in parallel with the upper face of the turntable 2 in the vicinity of the end of the rear side (left side in FIG. 1) of the turntable 2, a holder 5 that is tiltably attached to the turntable 2 through the tilt shaft 4 (it is possible to adjust its posture from a state of being vertically installed on the upper face of the turntable to a state of being inclined to the left and right so as to form a predetermined angle with respect to the upper face), at least two guide bars 7 fixedly supported by the holder 5 in parallel with the upper face of the turntable, a slider 8 provided slidably with respect to the guide bar 7, and a hinge 9 swingably connecting the cutting part 10 to the slider 8.

In order to fix the holder 5 at a predetermined inclination angle, a bracket 51 having a elongated hole 51a of a circular arc shape is vertically installed at a rear side of the holder 5 while being centered on the tilt shaft 4 from the rear side of the holder 5, and a shaft portion 52a of the clamp lever 52 is screwed into the holder 5 thereby passing through the elongated hole 51a. The holder 5 may be fixed at any inclination angle with respect to the upper face of the turntable due to the clamp lever 52 being clamping-manipulated. The holder 5 is fixed at a predetermined inclination angle and the circular saw blade 20 is accordingly fixed at the same inclination angle, thereby enabling the so-called inclination cutting.

In the cutting part 10, a rotational power of the motor 21 is transmitted to the rotational shaft 22 to which the circular saw blade 20 is fixed through a rotational power transmitting mechanism. The cutting part 10 includes a cutting part case 11 receiving the motor 21 and the rotational power transmitting mechanism. Further, a main cover 12 covering an upper portion of the circular saw blade 20 is integrally provided to the cutting part case 11.

Figure 5:
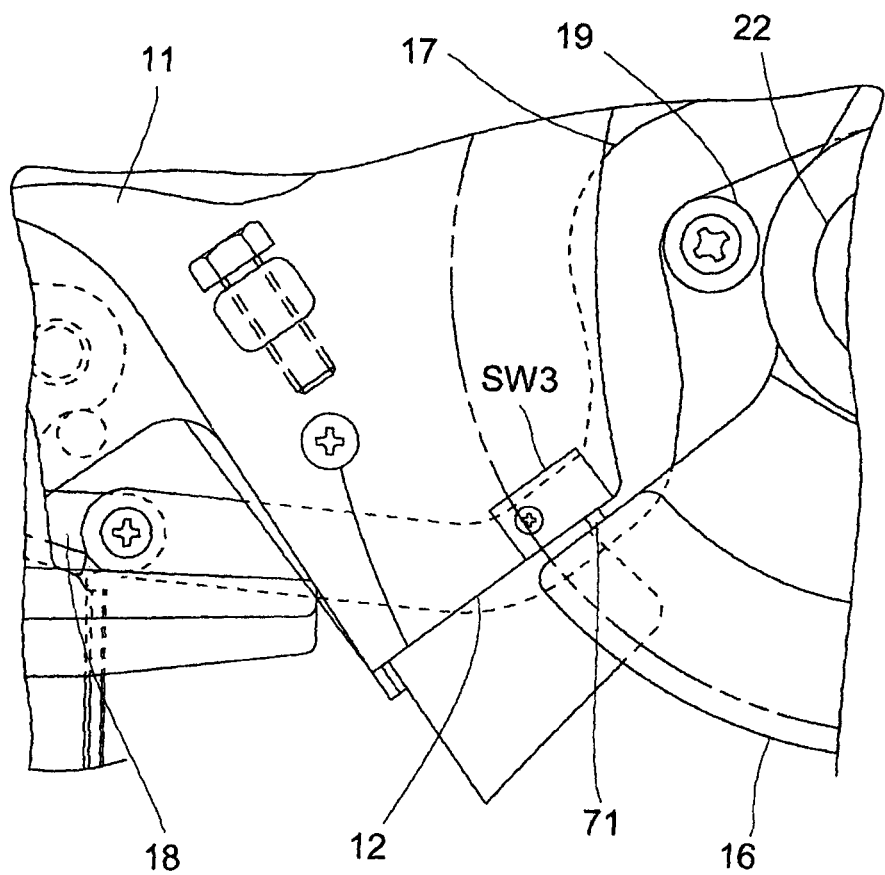
FIG. 5 is an enlarged side view showing an arrangement of a detection switch and a state before a protective cover is transferred in the first embodiment of the present invention.

The cutting part case 11 is provided at the rear end thereof with a connection portion 11a connected to the slider 8 through the hinge 9. The connection portion 11a is rotatably mounted to the slider 8 by means of a hinge pin 9a of the hinge 9, that is, so as to be swingably movable toward or apart from the base 1. The cutting part case 11 is urged in an upper direction by means of the spring 13 provided around the hinge pin 9a. Accordingly, the cutting part 10 is position-restricted at a top dead point (as shown in FIGS. 1 and 5) by a stopper (detailed descriptions omitted) provided around the hinge 9 unless any downward force is applied to an operating handle 14 provided on an upper portion of the cutting part case 11. Here, for the convenience of explanation, a position of the rotational shaft 22 to which the circular saw blade 20 is fixed is used as a reference of the position of the cutting part 10. That is, the rotational shaft 22 is positioned at a top dead point unless any downward operational force is applied to the operating handle 14. The operating handle 14 is provided with a trigger switch SW1 for controlling rotation or stop of the motor 21.

The cutting part case 11 is provided with a carrying handle 15 for carrying the circular saw as a whole, separately from the operating handle 14. The carrying handle 15 is provided with a cancel switch SW2. Function of the cancel switch SW2 will be described later.

The cutting part 10 has a protective cover 16 for covering a portion of the circular saw blade 20 which is not covered by the main cover 12. The protective cover 16 is supported so as to be rotatable along the inner side of the main cover 12. One end of a link 17 serving as a rotational mechanism of the protective cover 16 is connected to the protective cover 16, and the other end of the link 17 is connected to a fixing arm 18 fixed to the slider 8. The intermediate portion of the link 17 is adapted to contact with the roller 19 rotatably attached to the inner side of the main cover 12.

When the rotational shaft 22 of the cutting part 10 is in the top dead point, as the operating handle 14 is pushed down toward the bottom dead point, the protective cover 16 is rotated, by the link 17, counterclockwise as indicated by the arrow L in FIG. 1 to expose the circular saw blade 20. Accordingly, the circular saw blade is in a state in which the workpiece 40 can be cut.

Figure 3:
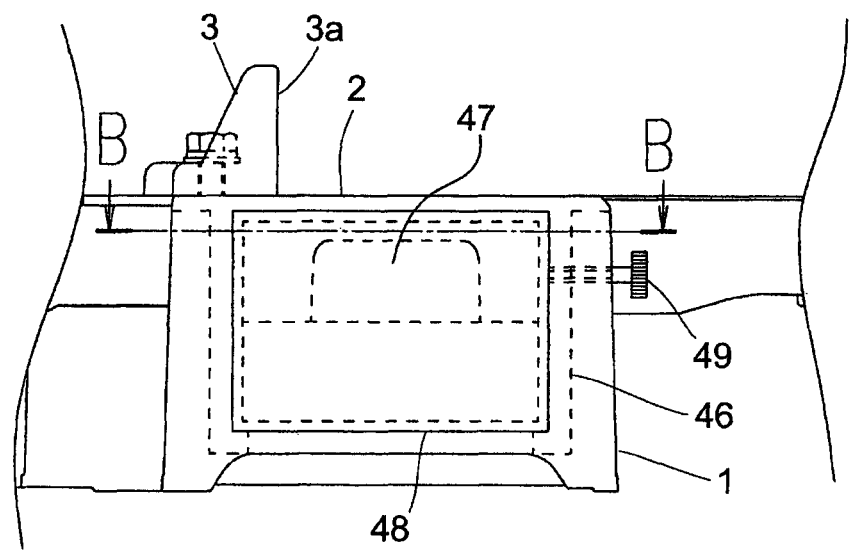
FIG. 3 is an enlarged side view showing a battery receiving compartment according to the first embodiment of the invention.
Figure 4:
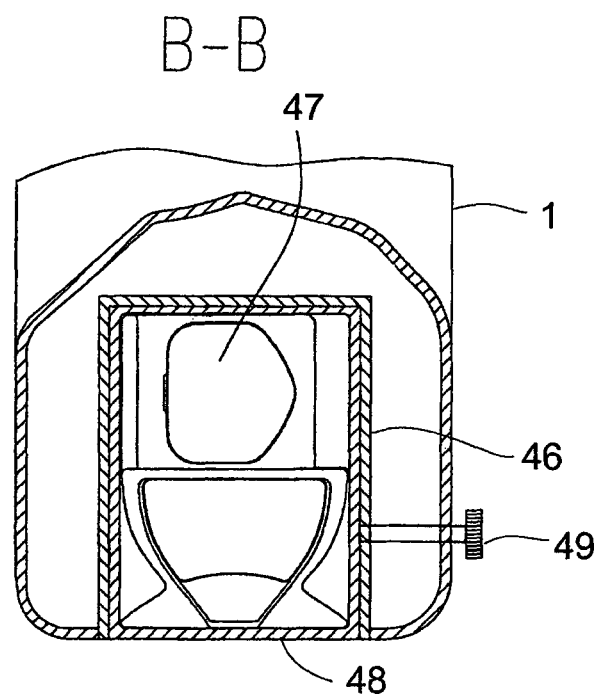
FIG. 4 is a sectional view taken along line B-B shown in FIG. 3.

The motor 21 is configured to use both battery power and AC commercial power supply as its power supply. The cutting part 10 is connected to a power cord 45 for the commercial power supply. Further, a battery receiving part 46 shown in FIGS. 3 and 4 is arranged to a portion which protrudes from a side of the base 1. The battery unit 48 with a battery 47 therein is secured by a locking screw 49 of the battery receiving part 46.

In the present embodiment, in order to reduce noise and power consumption, when the rotary shaft 22 of the cutting portion 10 is located at the top dead point (when there is no operational force in the direction of pushing down the operating handle 14), the motor 21 is rotated at a lower rotational speed (first rotational speed) than its maximum rotational speed. Further, when the rotational shaft 22 of the cutting part 10 is located at a bottom dead point side with respect to a predetermined swing position where the rotational shaft 22 is be positioned between the top dead point and the bottom dead point, the motor 21 is rotated at high speed (faster speed than the first rotational speed).

Figure 6:
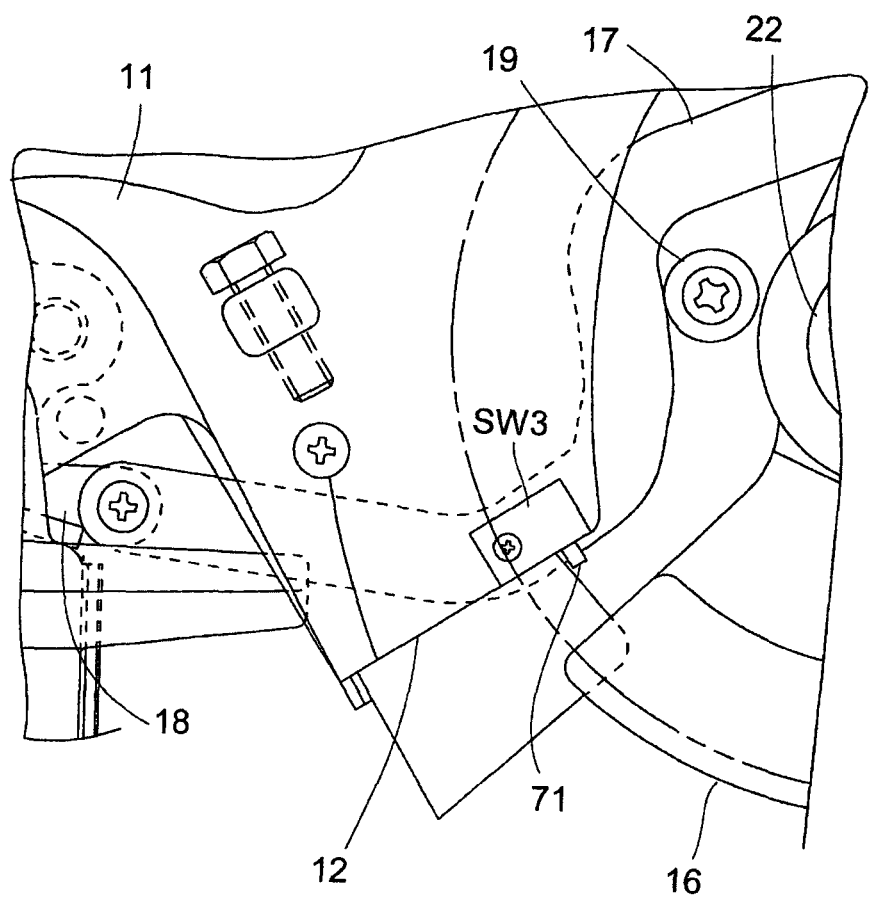
FIG. 6 is an enlarged side view showing an arrangement of a detection switch and a state after a protective cover is transferred in the first embodiment of the present invention.

As shown in FIGS. 5 and 6, in order to detect the position of the cutting part 10 (whether at the top dead point) by detecting the position of the protective cover 16, a detection switch SW3 (micro switch, etc.) as a detecting unit is attached to an edge portion of the main cover 12. The attachment position of the detection switch SW3 is a position where an operation unit 71 (actuator) of the detection switch SW3 is pressed by the protective cover 16 when the rotational shaft 22 of the cutting part 10 is positioned at the top dead point as shown in FIG. 5. Meanwhile, the operation unit 71 of the detection switch SW3 is not pressed by the protective cover 16 when the protective cover 16 is rotated as shown in FIG. 6 as the operating handle 14 is operated to move downward (i.e., the rotational shaft 22 of the cutting part 10 moves below the top dead point). Therefore, the detection switch SW3 is turned on when the rotational shaft 22 of the cutting part 10 is positioned at the top dead point, and turned off when the operation unit 71 of the detection switch SW3 is not pressed as the protective cover 16 is rotated.

Figure 7:
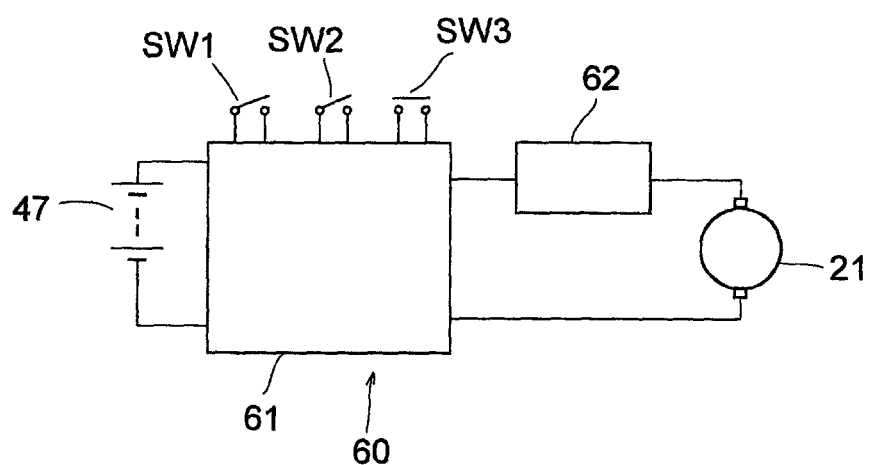
FIG. 7 is a schematic diagram showing a motor control system according to the first embodiment of the present invention.

FIG. 7 is a schematic configuration of a control system for controlling the rotational speed of the motor 21. The control unit 60 includes a control circuit 61 connected to the trigger switch SW1, the cancel switch SW2 and the detection switch SW3 and receiving power supplied from the battery 47, and a drive circuit 62 controlled by the control circuit 61 to change the supply voltage to the motor 21. The drive circuit 62 performs, for instance, a pulse width control (PWM) of a motor supply voltage. In the case where the AC commercial power supply is used, although not shown, the AC commercial power supply is stepped-down to a predetermined voltage, and then rectified and smoothed by a rectification smoothing circuit thereby obtaining DC voltage that is used instead of the battery voltage. The cancel switch SW2 serves to cancel the low-speed rotation so that the motor 21 is rotated at the maximum rotation speed even when the rotational shaft 22 of the cutting part 10 is positioned at the top dead point. Further, the switch SW2 functions as a manually operable cancel unit.

Figure 8:
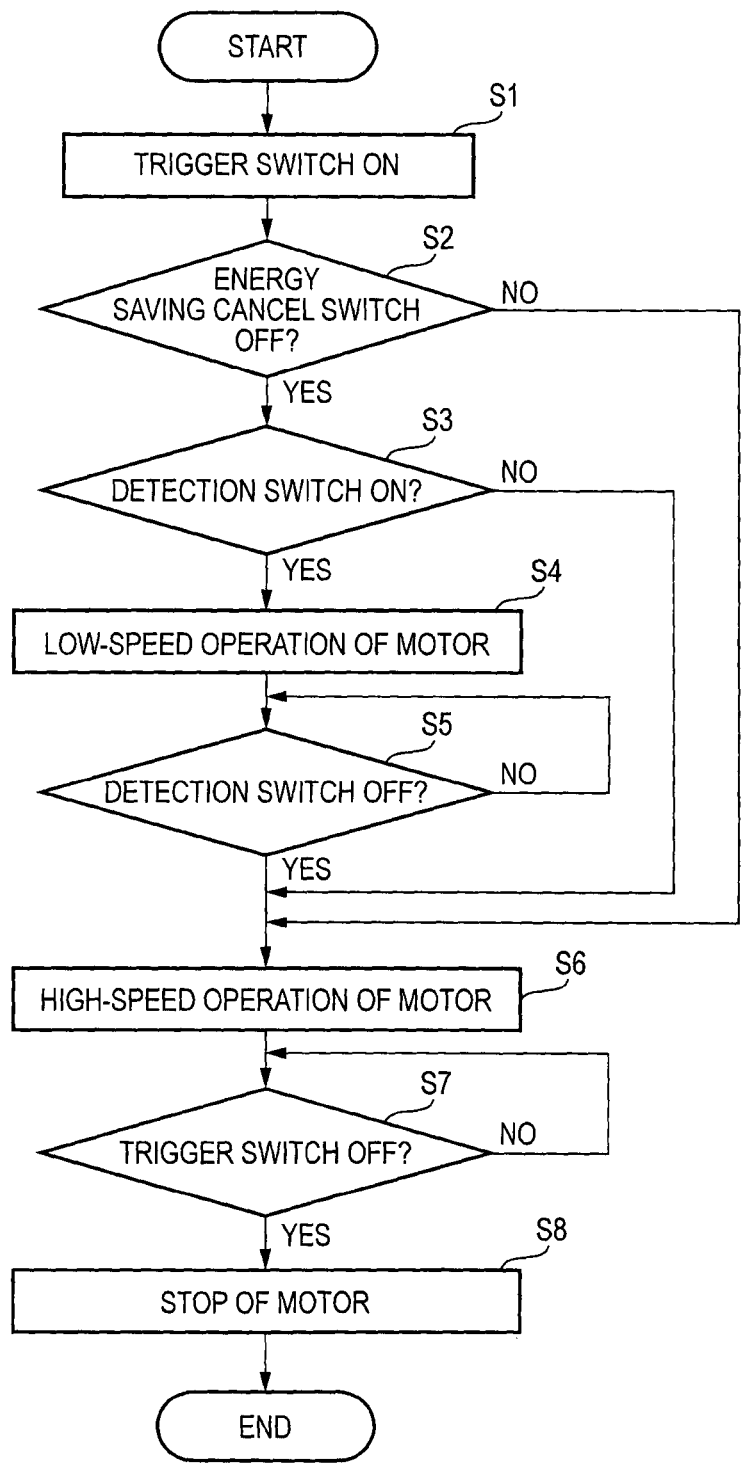
FIG. 8 is a flowchart illustrating an operation of the desk-top cutting machine according to the first embodiment.

FIG. 8 is a flowchart showing an example of operation according to the present embodiment. After the trigger switch SW1 is turned on in step S1, it is determined whether the cancel switch SW2 is off in step S2, and then the motor 21 is driven at high speed in step S6 in the case where the cancel switch SW2 is on (in the case of NO). That is, in the control unit 60 shown in FIG. 7, the control circuit 61 controls the drive circuit 62 so that the full voltage of the battery 47 is applied to the motor 21. At this time, instead of applying the full voltage to the motor 21 immediately, in order to reduce the noise and prevent swing of the cutting part 10 during startup of the motor, it is preferable that the drive circuit 62 is controlled by the control circuit 61 to perform the pulse width control of the motor supply voltage, thereby gradually increasing the effective voltage of the motor 21 to gradually increase the rotational speed of the motor 21 until it reaches the maximum rotational speed.

In step S2, it is determined whether the detection switch SW3 is on in a case where the cancel switch SW2 is off (in the case of YES). In a case where the detection switch SW3 is off (the state where the protective cover 16 is open) (in the case of NO), it is determined that the trigger switch SW1 has been turned on while an operator pushes down the operating handle 14 toward the workpiece 40, thereby proceeding to step S6 to operate the motor 21 at high speed.

In step S3, in the case where the detection switch SW3 is on (the state where the protective cover 16 is closed) (in the case of YES), it is determined that the operating handle 14 is not depressed and the rotational shaft 22 is positioned at the top dead point, and thereby the motor 21 is rotated at low speed in step S4, that is, at the first rotational speed slower than the maximum rotational speed. Accordingly, noise and power consumption can be reduced in standby mode. It is preferable that an effective voltage value of the motor 21 is gradually increased until reaching the effective voltage value required for the low-speed operation by the pulse width control of the control unit 60, thereby gradually increasing the rotational speed of the motor 21.

Thereafter, it is determined whether the detection switch SW3 is off (the state where the protective cover 16 is open) in step S5. In the case where the detection switch SW3 is on (the case where the protective cover 16 is closed) (in the case of NO), it is determined that there is no change in the state, and then the determination in Step S5 is repeated while continuing the slow speed operation.

In the case where the detection switch SW3 is off (the case where the protective cover 16 is opened) in step S5, the processing proceeds to step S6 where the motor 21 is operated at high speed. That is, the rotational speed is increased to the maximum rotation speed. During the high-speed operation of the motor 21, the workpiece 40 can be cut by depressing the operating handle 14 downward (by making the cutting part 10 slide if necessary) until the rotational shaft 22 of the cutting part 10 arrives at the bottom dead point.

Thereafter, in step S7, it is determined whether the trigger switch SW1 is turned off or not. In the case where the trigger switch SW1 is turned on (in the case of NO), the step S7 is repeated while the high-speed operation is performed.

In the case where the trigger switch SW1 is turned off (in the case of YES) in step S7, the motor stops in step S8.

Figure 9A:
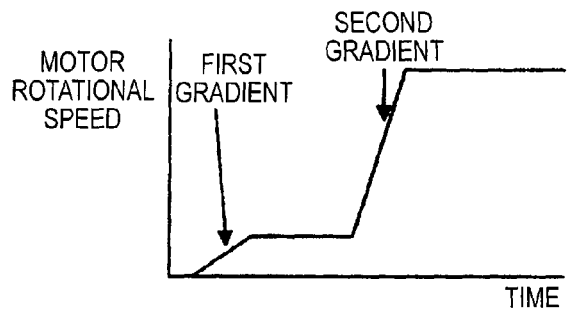
FIGS. 9A to 9C are explanation views illustrating a rotation control of a motor.

FIG. 9A shows an example of the relationship between time and the motor rotation speed (≈effective voltage) from the startup of the motor 21 to the low-speed operation of the motor 21 in step S4 and further to the high-speed operation of the motor 21 in step S6. As shown in FIG. 9A, when switching the rotational speed of the motor 21 from a state of the low-speed operation to a state of the high-speed operation, the control unit 60 performs a pulse width control of the motor supply voltage by controlling the drive circuit 62 through the control circuit 61. Thereby the switching is performed by gradually increasing the rotational speed of the motor by 21. Further, the motor speed is controlled so that a first gradient corresponding to a gradual increase of the rotational speed of the motor 21 during startup of the motor 21 is more gradual than a second gradient corresponding to a gradual increase of the rotational speed of the motor 21 when switching from the low-speed operation to the high-speed operation.

Figure 9B:
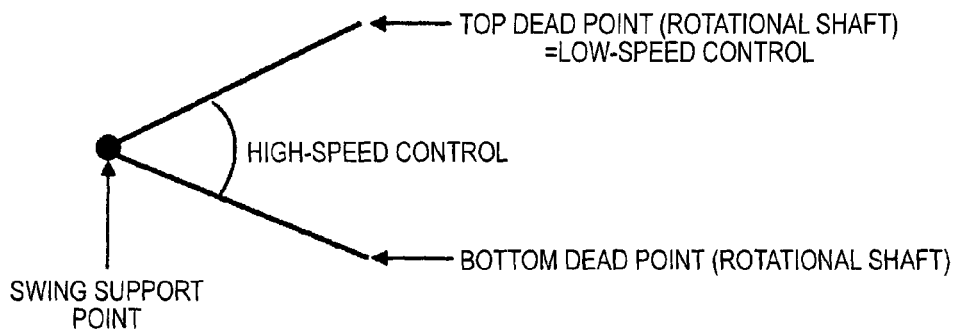

FIG. 9B shows an explanation view in which a region of high-speed control for performing a high-speed operation and a region of low-speed control for performing a low-speed operation of the motor 21 are divided, in a case where the rotational shaft 22 of the cutting part 10 is lowered from the top dead point toward the bottom dead point with respect to the swing support point (hinge pin 9a). In a case of detecting the position of the protective cover 16 by the arrangement of the detection switch SW3 shown in FIGS. 5 and 6, since the protective cover 16 is opened widely by just pushing down slightly the operating handle 14, the region where the low-speed operation is performed is in a very narrow range containing a position of the top dead point. That is, the predetermined swing position of the cutting part 10 (viewed from the position reference of the rotational shaft 22) that switches from the low-speed operation to the high-speed operation is positioned at a top dead point side more sufficiently than the swing position of the cutting part 10 at which the cutting of the workpiece 40 is started and which requires the maximum cutting capacity.

According to the first embodiment, it is possible to achieve the following effects.

(1) Since the motor 21 is in a standby mode of a low-speed rotation when the rotational shaft 22 of the cutting part 10 is located at the top dead point, and the motor 21 is switched to high speed when the press operation of the operating handle 14 is performed, it is possible to achieve a reduction in noise and achieve power saving without impairing the ability of cutting the workpiece 40.

(2) The control unit 60 is capable of controlling the motor 21 to gradually increase its rotational speed when starting the motor 21, and capable of reducing the noise and preventing the cutting portion 10 from swinging during startup of the motor.

(3) The control unit 60 is capable of performing switching operation while gradually increasing the rotational speed of the motor when switching the rotational speed of the motor 21 from low-speed rotation to high-speed rotation. Accordingly, although the cutting part 10 intended to swing downward swings upward due to reaction force when the rotational speed of the motor 21 is suddenly switched, it is possible to prevent such phenomenon by gradually increasing the rotational speed of the motor.

(4) As described in FIG. 9A, regarding the first gradient of gradually increasing the motor rotational speed during startup of the motor 21 and the second gradient of gradually increasing the motor rotational speed when switching from the low-speed the rotation to high-speed rotation, the control unit 60 may control the speed of the motor so that the first gradient is more gradual than the second gradient. If the second gradient is gradual and the speed is gradually increased, there is a possibility that the rotational speed of the motor cannot reach its maximum rotational speed before start of cutting, and accordingly there is a problem that the cutting quality may deteriorate. However, by making the second gradient relatively steep, it is possible to avoid the problem.

Figure 10:
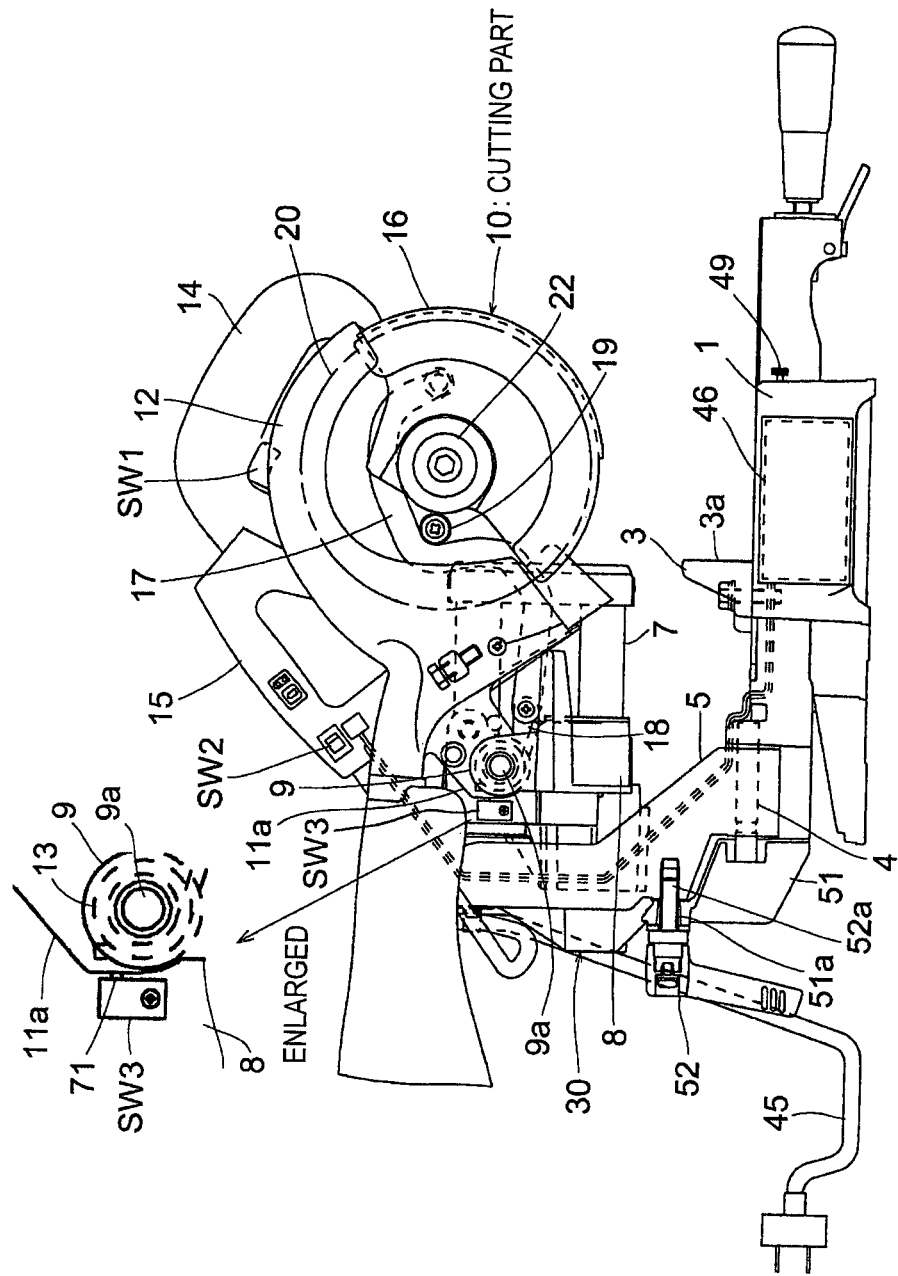
FIG. 10 is a side view showing a second embodiment of the present invention.

FIG. 10 shows a second embodiment of the present invention. The second embodiment is different from the first embodiment in the arrangement of the detection switch SW3. That is, the cutting part support mechanism 30 has a hinge 9 swingably connected to the cutting part 10, and is provided with the detection switch SW3 disposed on the slider 8 near the hinge 9. The position of the connection portion 11a of the cutting part case 11 connected to the slider 8 via the hinge 9 is detected by the detection switch SW3. In this case, the detection switch SW3 becomes a mechanism for detecting the relative movement of the other member with respect to one member around the hinge 9.

In FIG. 10, the rotational shaft 22 of the cutting part 10 is positioned at the top dead point, the operation unit 71 (actuator) of the detection switch SW3 is pressed by the edge portion of the connection portion 11a, and accordingly, the detection switch SW3 is turned on. As the operating handle 14 is operated toward the bottom dead point, the operation unit 71 of the detection switch SW3 is no longer pressed by the connection portion 11a and thereby turned off.

Figure 9C:
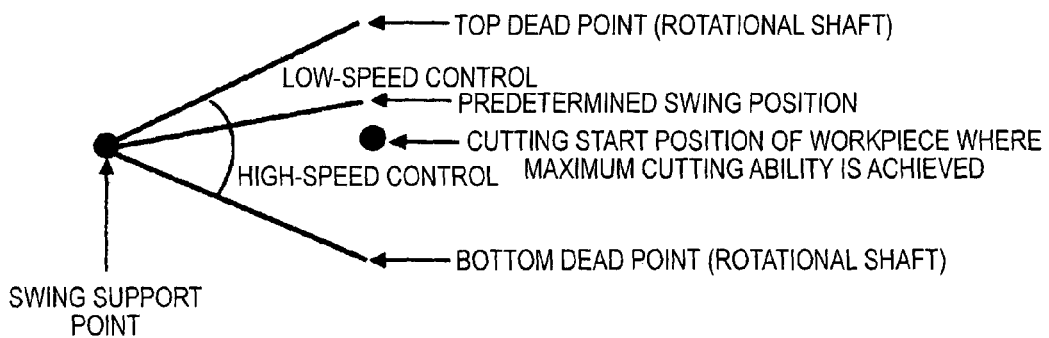

In the case of the second embodiment, since the movement of the connection portion 11a according to the press operation of the operating handle 14 is slow compared to the movement of the protective cover 16, the division of the regions of the low-speed control and high-speed control becomes possible to be set as in FIG. 9C in which the region of low-speed control is enlarged compared to that of FIG. 9B. The region of the low-speed control is from the top dead point of the rotational shaft 22 of the cutting part 10 to the predetermined swing position thereof. However, the predetermined swing position is positioned at the top dead point side with respect to the position at which the cutting part 10 starts cutting of the workpiece 40 and has the maximum cutting ability. This is necessary in order not to reduce the cutting ability.

Figure 11:
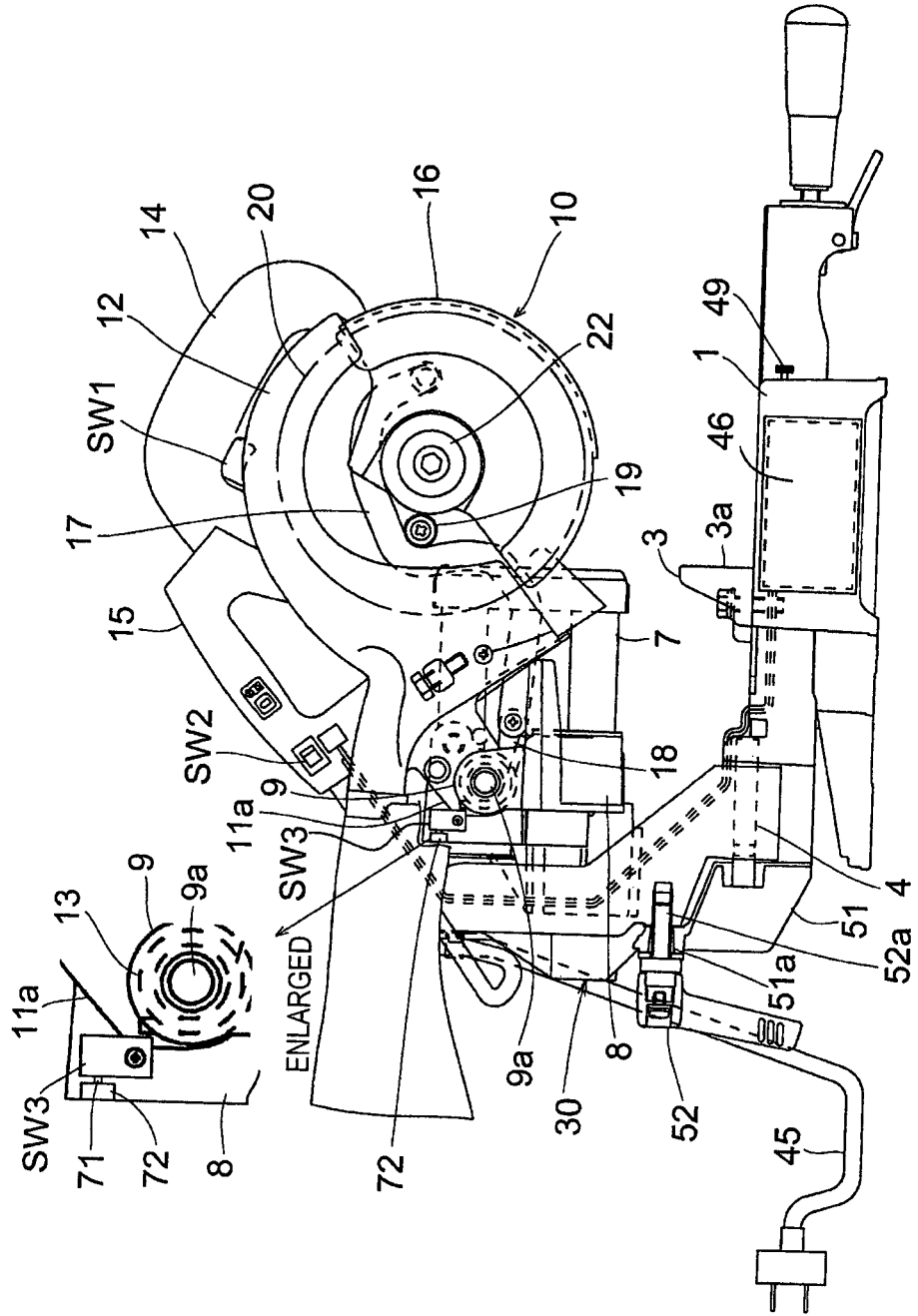
FIG. 11 is a side view showing a third embodiment of the present invention.

FIG. 11 shows a third embodiment of the present invention. The detection switch SW3 is in the vicinity of the hinge 9, while the arrangement of the detection switch SW3 is opposite to that of the second embodiment described above. That is, the detection switch SW3 is attached to the connection portion 11a of the cutting part case 11 connected to the slider 8 via the hinge 9, and an abutting member 72 is fixed to the slider 8 to press the operation portion 71 of the detection switch SW3.

In the state shown in FIG. 11, the rotational shaft 22 of the cutting part 10 is positioned at the top dead point, the operation unit 71 of the detection switch SW3 is pressed by the abutting member 72 of the slider 8 side, and the detection switch SW3 is turned on accordingly. As the operating handle 14 is operated toward the bottom dead point, the operation unit 71 of the detection switch SW3 is no longer pressed by the abutting member 72 and thereby turned off.

Even in the case of the third embodiment, since the movement of the connection portion 11a according to the press operation of the operating handle 14 is slow compared to the movement of the protective cover 16, the division of the regions of the low-speed control and high-speed control becomes possible to be set as in FIG. 9C in which the region of low-speed control is enlarged compared to that of FIG. 9B.

In the second and third embodiments, there is a case where the predetermined swing position of switching from the low-speed control shown in FIG. 9C to high-speed control is positioned closer to the bottom dead point than in the first embodiment. For that reason, the second gradient is made steeper than the first gradient shown in FIG. 9A and accordingly the control unit 60 controls the motor 21 so that the rotational speed of the motor may reach its maximum rotational speed before start of cutting. Thereby, it is possible to avoid the problem that the motor rotational speed cannot reach its maximum rotational speed before start of cutting operation and the cutting quality deteriorates accordingly. The other effects are the same as in the first embodiment.

In the foregoing, the present invention has been described according to the preferred embodiments. However, it will be appreciated by those skilled in the art that changes may be made in these embodiments without departing from the principles and spirit of the claimed invention. Hereinafter, modification examples will be described.

In the first embodiment, the control unit 60 has been described as controlling the rotational speed of the motor, for example, by a pulse width control of the motor supply voltage. However, the configuration of the control unit 60 is not limited thereto but frequency control and phase control of the motor supply voltage may also be possible.

In each embodiment, the detection switch SW3 is assumed as a mechanical micro switch or the like but may be a proximity switch or the like.

In each embodiment, the circular saw blade has been illustrated as a cutting tool, but the present invention may be applied to high-speed cutting machine using a grindstone as a cutting tool.

The present invention provides illustrative, non-limiting examples as follows:

(1) According to a first aspect, there is provided a desk-top cutting machine including: a base configured to support a workpiece; a cutting part including, a motor configured to rotary drive a cutting tool, a main cover covering an upper portion of the cutting tool, and a protective cover covering a portion of the cutting tool that is not covered by the main cover, the protective cover configured to move in a direction of exposing the cutting tool when the cutting part swings toward a bottom dead point from a top dead point; and a cutting part support mechanism configured to swingably support the cutting part, characterized in that: the motor is configured to be rotated at a first rotational speed slower than a maximum rotational speed thereof when the cutting part is positioned at the top dead point.

(2) According to a second aspect, there is provided the desk-top cutting machine according to the first aspect, wherein the motor is configured to rotate at a rotational speed faster than the first rotational speed, when the cutting part is positioned at the bottom dead point side with respect to a predetermined swing position positioned between the top dead point and the bottom dead point.

(3) According to a third aspect, there is provided the desk-top cutting machine according to the second aspect, further including a detecting unit configured to detect a position of the cutting part, wherein the rotational speed of the motor is configured to be switched based on a detection result of the detecting unit.

(4) According to a fourth aspect, there is provided the desk-top cutting machine according to the third aspect, wherein the detecting unit is configured to detect the position of the cutting part by detecting a position of the protective cover.

(5) According to a fifth aspect, there is provided the desk-top cutting machine according to the third aspect, further including a control unit configured to control the rotational speed of the motor, wherein the detecting unit is configured to input the detection result to the control unit, and wherein the control unit is configured to switch the rotational speed of the motor from the first rotational speed to a rotational speed faster than the first rotational speed, based on the detection result of the detecting unit.

(6) According to a sixth aspect, there is provided the desk-top cutting machine according to the fifth aspect, wherein the control unit is configured to switch the rotational speed of the motor from the first rotational speed to the speed faster than the first rotational speed by gradually increasing the rotational speed of the motor.

(7) According to a seventh aspect, there is provided the desk-top cutting machine according to the fifth or sixth aspect, wherein the control unit is configured to control the motor so as to gradually increase the rotational speed of the motor during starting-up of the motor.

(8) According to an eighth aspect, there is provided the desk-top cutting machine according to the seventh aspect, wherein a first gradient corresponding to a gradual increase of the rotational speed of the motor during startup of the motor is more gradual than a second gradient corresponding to a gradual increase of the rotational speed of the motor when switching from the first rotational speed to the speed faster than the first rotational speed.

(9) According to a ninth aspect, there is provided the desk-top cutting machine according to the second aspect, wherein the predetermined swing position is positioned at the top dead point side with respect to a swing position of the cutting part at which cutting of a workpiece is started and the cutting part has a maximum cutting ability.

(10) According to a tenth aspect, there is provided the desk-top cutting machine according to the first aspect, further including a manually operable cancel unit configured to cancel a rotation control at the first rotational speed such that the motor rotates at a maximum rotational speed even when the cutting part is positioned at the top dead point.

(11) According to an eleventh aspect, there is provided the desk-top cutting machine according to the third aspect, wherein the cutting part support mechanism includes a hinge swingably connected to the cutting part, and wherein the detecting unit is provided adjacent to the hinge.

(12) According to a twelfth aspect, there is provided the desk-top cutting machine according to the first aspect, wherein the base or the cutting part is provided with a battery and power is supplied to the motor from the battery.

It will be appreciated by those skilled in the art that all arbitrary combinations of the above-described constituents, and all conversions of expression, made among methods or systems, are also within the scope of the present invention.

This application claims priority from Japanese Patent Application No. 2012-155178 filed on Jul. 11, 2012, the entire contents of which are incorporated herein by reference.

INDUSTRIAL APPLICABILITY

According to an aspect of the invention, there is provided a desk-top cutting machine which is capable of reducing noise and reducing power consumption.

The invention claimed is:
1. A desk-top cutting machine comprising:
a base configured to support a workpiece;
a cutting part including,
 a motor configured to rotary drive a cutting tool,
 a main cover covering an upper portion of the cutting tool,
 a protective cover covering a portion of the cutting tool that is not covered by the main cover, the protective cover configured to move in a direction of exposing the cutting tool when the cutting part swings toward a bottom dead point from a top dead point; and
 a cutting part support mechanism configured to swingably support the cutting part, and a detecting unit configured to detect a position of the cutting part,
characterized in that the motor is configured to be rotated at a first rotational speed slower than a maximum rotational speed thereof when the cutting part is positioned at the top dead point,
wherein the motor is configured to rotate at a rotational speed faster than the first rotational speed, when the cutting part is positioned at the bottom dead point side with respect to a predetermined swing position positioned between the top dead point and the bottom dead point and
wherein the rotational speed of the motor is configured to be switched based on a detection result of the detecting unit.

2. The desk-top cutting machine according to claim 1, wherein the detecting unit is configured to detect the position of the cutting part by detecting a position of the protective cover.

3. The desk-top cutting machine according to claim 1, further comprising a control unit configured to control the rotational speed of the motor,
wherein the detecting unit is configured to input the detection result to the control unit, and
wherein the control unit is configured to switch the rotational speed of the motor from the first rotational speed to a rotational speed faster than the first rotational speed, based on the detection result of the detecting unit.

4. The desk-top cutting machine according to claim 3, wherein the control unit is configured to switch the rotational speed of the motor from the first rotational speed to the speed faster than the first rotational speed by gradually increasing the rotational speed of the motor.

5. The desk-top cutting machine according to claim 3, wherein the control unit is configured to control the motor so as to gradually increase the rotational speed of the motor during starting-up of the motor.

6. The desk-top cutting machine according to claim 5, wherein a first gradient corresponding to a gradual increase of the rotational speed of the motor during startup of the motor is more gradual than a second gradient corresponding to a gradual increase of the rotational speed of the motor when switching from the first rotational speed to the speed faster than the first rotational speed.

7. The desk-top cutting machine according to claim 1, wherein the machine is configured such that the cutting part has a maximum cutting ability when the predetermined swing position is positioned at the top dead point side with respect to a swing position of the cutting part at which cutting of the workpiece is started.

8. The desk-top cutting machine according to claim 1, further comprising a manually operable cancel unit configured to cancel the first rotational speed such that the motor rotates at a maximum rotational speed even when the cutting part is positioned at the top dead point.

9. The desk-top cutting machine according to claim 1, wherein the cutting part support mechanism includes a hinge swingably connected to the cutting part, and wherein the detecting unit is provided adjacent to the hinge.

10. The desk-top cutting machine according to claim 1, wherein the base or the cutting part is provided with a battery and power is supplied to the motor from the battery.

* * * * *